(12) United States Patent
Morgan et al.

(10) Patent No.: US 6,403,883 B1
(45) Date of Patent: Jun. 11, 2002

(54) COMBINATION PROTECTIVE COVERING INSERT AND LOCATOR FOR AN ELECTRICAL OUTLET BOX UTILIZED IN A WALL COVERING APPLICATION

(76) Inventors: Samuel Morgan, 3362 N. Henderson Rd.; Robert L Howell, 3227 Washburn Rd., both of Davidson, MI (US) 48423

( * ) Notice: Subject to any disclaimer, the term of this patent is extended or adjusted under 35 U.S.C. 154(b) by 0 days.

(21) Appl. No.: 09/814,018

(22) Filed: Mar. 21, 2001

(51) Int. Cl.$^7$ .................... H01H 13/04; G01B 1/00
(52) U.S. Cl. .................... 174/58; 33/528; 33/DIG. 10; 220/3.3
(58) Field of Search ................ 174/58, 50, 53, 174/66; 220/38, 241, 242, 3.2, 3.3; 33/528, DIG. 10

(56) References Cited

U.S. PATENT DOCUMENTS

| | | |
|---|---|---|
| 3,884,280 A | 5/1975 | Chailer |
| 4,059,905 A | 11/1977 | Wieting |
| 4,087,913 A | 5/1978 | Jackson |
| 4,134,636 A * | 1/1979 | Kleinatland et al. .......... 174/58 |
| 4,202,388 A | 5/1980 | Wieting |
| 4,209,103 A | 6/1980 | Glovier |
| 4,335,511 A | 6/1982 | Bowling |
| 4,359,302 A * | 11/1982 | Payne .................. 33/DIG. 10 |
| 4,384,396 A | 5/1983 | Smolik |
| 4,605,139 A | 8/1986 | Dacar |
| 4,907,711 A | 3/1990 | Stuchlik, III |
| 4,951,395 A | 8/1990 | Lameiro |
| 4,953,733 A | 9/1990 | Loscuito |
| 4,969,269 A | 11/1990 | Dominguez |
| 5,040,304 A * | 8/1991 | Jackson ................. 33/DIG. 10 |
| 5,129,297 A * | 7/1992 | Bussi ................... 33/DIG. 10 |
| 5,136,788 A * | 8/1992 | Jackson ................. 33/DIG. 10 |
| 5,157,844 A * | 10/1992 | Mallison et al. ........ 33/DIG. 10 |
| 5,224,803 A | 7/1993 | Lallier |
| 5,301,437 A | 4/1994 | Burke |
| 5,639,991 A | 6/1997 | Schuette |
| 5,797,189 A | 8/1998 | Gilbert |
| 6,055,736 A * | 5/2000 | Gaston ..................... 33/528 |
| 6,101,731 A * | 8/2000 | Mesa ........................ 33/528 |

* cited by examiner

Primary Examiner—Dean A. Reichard
Assistant Examiner—Angel R. Estrada
(74) Attorney, Agent, or Firm—Gifford, Krass, Groh, Sprinkle, Anderson & Citkowski, P.C.

(57) ABSTRACT

A combination protective covering and locating insert for use with an electrical utility box during an application of a wall covering material over a structural framing to which the insert is secured. The utility box includes a peripherally extending edge, typically in either a rectangular or square/oval shape and associated and inwardly facing surface defining a recessed interior. The insert is constructed as a three dimensional housing with a forward facing and peripherally extending planar face and a rearwardly spaced and recessed base surface, connected together by at least one side wall. The side walls in combination define a mating configuration with the peripherally extending edge of the utility box. A spike is secured to a midpoint location of the recessed base surface and extends forwardly a predetermined spaced distance beyond the peripherally extending planar face. The spike pierces through a specified location of the wall covering material during application over the matingly engaged insert and identifies a midpoint location of the utility box for subsequent removal of the wallboard overlying the utility box.

6 Claims, 2 Drawing Sheets

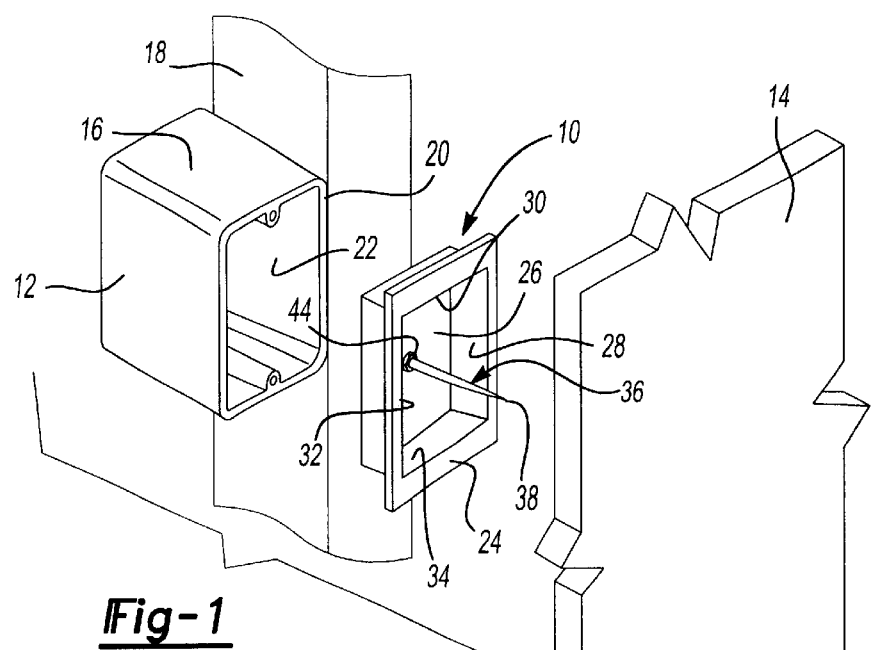
Fig-1
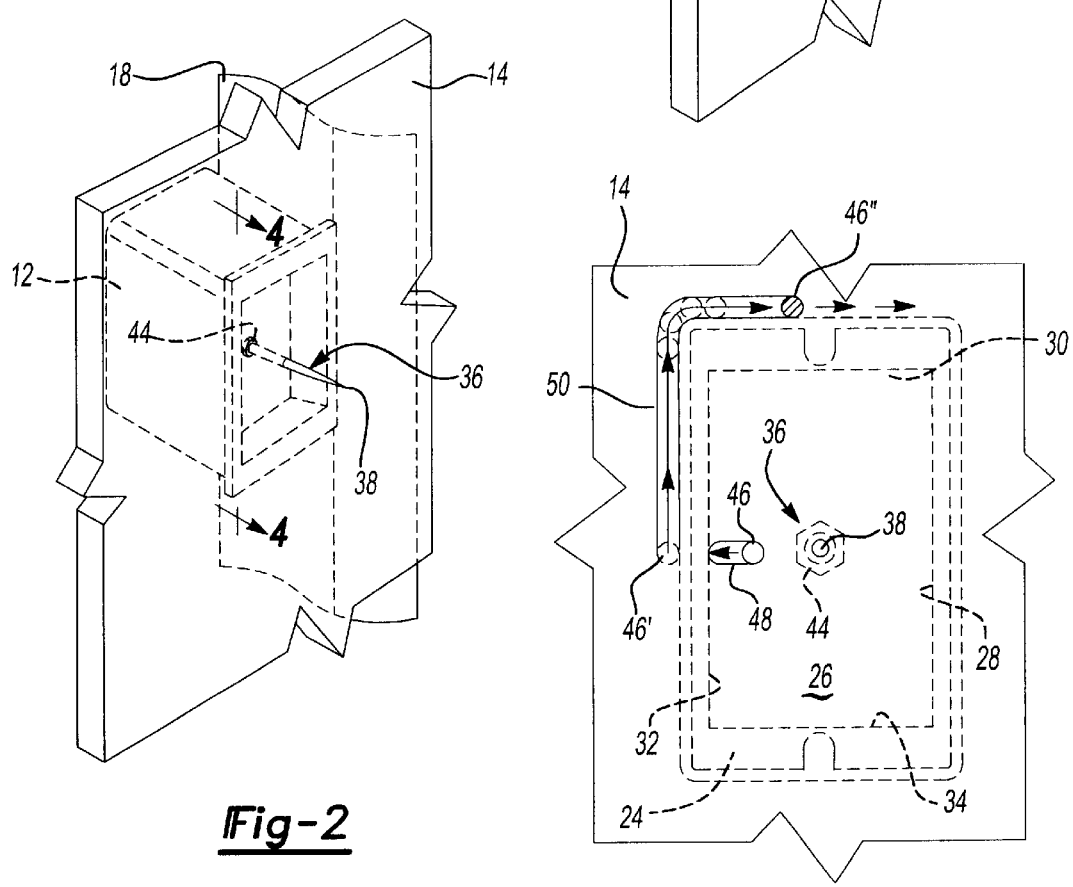
Fig-2
Fig-3

COMBINATION PROTECTIVE COVERING INSERT AND LOCATOR FOR AN ELECTRICAL OUTLET BOX UTILIZED IN A WALL COVERING APPLICATION

BACKGROUND OF THE INVENTION

1. Field of the Invention

The present invention relates generally to locating devices for use with existing electrical outlet boxes and, more specifically, to an improved and combination protective covering insert and locator for use with an existing electrical outlet box and utilized to effectively and efficiently pinpoint tile position of the box after the application of a covering layer of a wallboard material. Furthermore, the combination insert and locator of tile present invention provides tile additional benefits of effectively locating tile box without damaging the areas of the wall covering outside of the perimeter defined by the outlet box and further protects the wiring inside of tile box during the application of a routering operation to remove the portion of wall covering overlaying the box.

2. Description of the Prior Art

The prior art is well documented with examples of electrical utility outlet boxes and/or inserts for use with such outlet boxes. The objective and purpose of such apparatuses is to facilitate the location of the outlet box after a wall covering or wall board material is secured over the outlet box. In such an application, the outlet box is previously secured to a facing surface of a stud or like length of structural framework over which the wall covering is subsequently applied.

U.S. Pat. No. 4,202,388, issued to Wieting, discloses an apparatus and method for cutting access openings into wall or ceiling panels for electrical outlet boxes and which includes locator pins for positioning in the cover plate mounting holes of the electrical outlet/switch box. A cutter spacer is placed in a predetermined position relative to the locator pins and attached to the panel. A cutter locator ring is positioned over the cutter spacer and a cutter guide is positioned over the locator ring and attached to the panel. The cutter guide locator ring is removed to allow a cutter to be positioned between the cutter spacer and the cutter guide and to make a cut around the inside of the cutter guide. As the cut is being made, the cutter is guided by the inside surface of the cutter guide while the cutter is held by the cutter spacer to limit the depth of the cut and to prevent the cutter from moving inwardly with the panel after the access opening has been cut in the panel.

The prior art device of Wieting, while achieving the objective of locating the underlying outlet box after the wallboard application, appears to disclose a number of shortcomings. Among these are included tile positioning of the spike piercing elements at locations proximate the outer periphery of the outlet box. Experience has taught that, while effective in piercing through the wallboard material, the outer peripheral location of the spikes will additionally cause undesirable damage to areas of the wallboard or wall covering material beyond the outlet box. Additionally, the provision of so many components to the device, these including the locator pins, cutter spacer, cutter locator ring, and cutter guide, render it highly undesirable and impractical for use by professional drywall installers and to whom case of use and efficiency are paramount.

U.S. Pat. No. 4,059,905, also issued to Wieting, illustrates another variation of an apparatus for locating outlet box access openings and which again includes a locator pin assembly (with two outwardly facing and peripherally locating piercing spikes) which is placed over the outlet box prior to the wallboard application. A template is mounted on the protruding pins to guide a cutting tool as it cuts the access openings for the box. The pins extend different distances on opposite sides of the plate to account for materials of differing thickness, such as wooden paneling or drywall material. An extractor is provided to attach the template to the locator pin assembly through the covering member to hold the template in position during the cutting operation and to allow the scrap and locator pill assembly to be removed together through the access opening. As with the Wieting '388 reference, Wieting '905 teaches an apparatus while, arguably effective, suffers from the shortcomings of both excessive complication in components and application (unsuitable for high volume and professional drywall installers) as well as the previously described disadvantage associated with the peripherally located spike portions.

U.S. Pat. No. 4,907,711, issued to Stuchlik, III, as well as U.S. Pat. No. 4,953,733, issued to Loscuito, both illustrate outlet box locating devices and each of which includes a cover plate with prong shaped projections extending from each of the four peripheral edge locations. As with the Wieting devices, Stuchlik and Loscuito again suffer from tile inevitability of damaging the wall covering material which surrounds the underlying outlet box. Furthermore, the planar configuration of the covering plate in each reference limits the installer's ability to correctly determine the outer peripheral edge location of the outlet box. It is a preferred technique of installers to pierce the wallboard material at a location overlaying the box interior and, subsequently, to work the routing bit to an outer peripheral edge location and while, in the process, limiting to the degree possible collateral damage to the wallboard material lying outside the periphery of the outlet box.

U.S. Pat. No. 4,209,103, issued to Glovier, teaches a utility box locator including a support mounted in resistively secured fashion to the utility box and from which a locator pin projects. A template of perimeter size and shape approximating the box is formed with an aperture sized to receive the locator pin and, after the application of the wall covering material and subsequent puncture by the locator pins, the template is replaced in aligning fashion with the pins and over the exterior of tie wall covering so that the user may trace the perimeter of the template and subsequently gauge the correct dimensions of the underlying utility box.

Finally, U.S. Pat. No. 5,639,991, issued to Schuette, teaches a utility box protective insert which includes ribbed posts or shanks that fit into the openings of the box with a fit that retains the insert in place. The insert is easily removed and also protects the threaded bores in the box that are used for supporting switches, receptacles, light fixtures and the like. Applicant further notes that tile location and configuration of the projecting tabs precludes the user's ability to rout around the exterior perimeter of the box.

SUMMARY OF THE PRESENT INVENTION

The present invention is an improved and combination protective covering insert and locator for use with an existing electrical outlet box and which is utilized in particular by a professional drywall installer to effectively and efficiently pinpoint the position of the outlet box during tile application of a covering layer of a wallboard material. The insert is also configured to be quickly retrieved by tile installer after sectioning of the desired portion of wall covering material and to be quickly reused to locate subsequent utility outlet and switch boxes. Furthermore, tile combination insert and locator of tile present invention provides tile additional benefits of effectively locating the box without damaging the areas of the wall covering outside of the perimeter defined by the outlet box and further protects the wiring inside of the box during the application of a routering or other suitable sawing operation to remove the portion of wall covering overlaying the box.

In practice, the electrical utility box is secured, typically by nailing, against a structural member forming a part of a structural framework and over which it is desirous to apply the wall covering material. The utility box is, by itself, conventionally known in the art and includes both metal and, more recently, plasticized construction. Tile utility box further includes a peripherally extending edge and at least one inwardly facing surface defining, in part, a recessed interior and into which extends plurality of wires for subsequent communication to a wall outlet plug, switch or the like.

The combination protective covering and insert is constructed as a three dimensional housing with a forward facing and peripherally extending planar face, a rearwardly spaced and recessed base surface, and at least one side wall connecting the peripherally extending planar face and the rearwardly spaced base to define the recessed interior. In one preferred embodiment, four interconnecting side walls establish a substantially rectangular shaped insert for matingly engaging with a likewise rectangular shaped and single gang or double gang sized outlet box. Another preferred embodiment contemplates a substantially circular or oval shaped insert exhibiting a single and arcuate shaped side wall for matingly engaging within likewise shaped utility boxes, particularly for lamps and other types of overhead ceiling fixtures.

A spike is secured to the recessed base surface at a substantially midpoint location of the insert and extends outwardly and forwardly to a point a predetermined spaced distance beyond the peripherally extending planar face. The projected spacing of the spike is required so that at least its tip will engage and pierce the wall covering material, typically drywall or a like consistency material which may be pierced upon application of a reasonable degree of pressure against tile spike. The spike pierces through a specified location of the wall covering material during application of tie wall covering material over the insert and identifies a midpoint of the utility box interior. As also previously stated, the location of tile spike relative to the insert and associated utility box ensures that the damage to the wall covering material (resulting from the intended piercing) is localized in the area of tile material overlaying the box, and which is intended to be removed, and does not extend to adjacent and outlaying areas of wall covering bordering outside the box.

In one embodiment, the spike further comprising an elongated fastener having a specified plurality of exteriorly facing threads located proximate a head of the fastener. The spike inserts through an aperture defined in the recessed base surface and is secured in place by a threadably engageable nut. In a further preferred embodiment, the spike is constructed of a plasticized material integrally formed with the insert during an injection molding process. To facilitate penetration through the thickness of the wall covering material, and to provide reinforcing rigidity to prevent bending, the spike further includes a plurality of circumferentially offset and linear extending flutes.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an exploded view of a combination protective covering insert and locator according to a first preferred embodiment of the present invention and prior to an application of an overlying layer of a wall covering material;

FIG. 2 is a view illustrating the wall covering installed over the covering insert and locator according to the present invention and showing the centrally disposed spike in piercing fashion through the wall covering material;

FIG. 3 is a frontal view of the wall covering applied over the underlying insert and locator, as substantially illustrated in FIG. 2, and further illustrating the ability of tile insert to accommodate insertion of a router to a shallow drilling depth, following which the router is maneuvered to an outer peripheral location of the utility box to complete the removal of the wall covering overlaying the box;

DETAILED DESCRIPTION OF THE PREFERRED EMBODIMENTS

Figure 4:
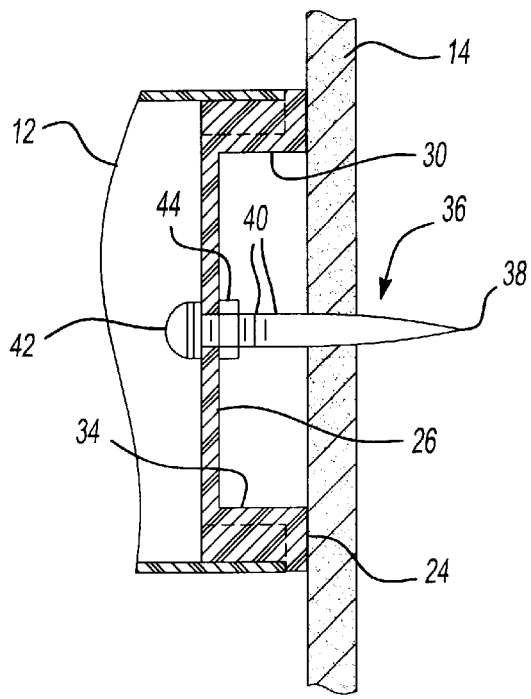
FIG. 4 is a cutaway taken along line 4—4 of FIG. 2 and illustrating the manner in which the spike pierces the wall covering material.

Referring to FIG. 1, an improved and combination protective covering insert and locator is illustrated at 10 for use with an existing electrical outlet box 12 and which is utilized in particular by a professional drywall installer to effectively and efficiently pinpoint the position of the outlet box 12 during the application of a covering layer of a wallboard material 14. As also has been previously stated, the insert 10 is configured to be quickly retrieved by the installer after sectioning of the desired portion of wall covering material 14 and to be quickly reused to locate subsequent utility outlet and switch boxes. Furthermore, the combination insert and locator of the present invention again provides the additional benefits of effectively locating the box without damaging the areas of the wall covering outside of the perimeter defined by the outlet box and further protects the wiring inside of the box during application of a routering or other suitable sawing operation, as will be subsequently described, to remove tile portion of wall covering overlaying the box.

The electrical utility box 12 is secured, typically by nailing 16, against a structural member 18 forming a part of a structural framework (not illustrated) and over which it is desirous to apply the wall covering material 14. Such applications typically encompass drywall applied to walls and ceilings of room interiors. The utility box 12 is, by itself, conventionally known in the art and includes both metal and, more recently, plasticized construction. The utility box 12 further includes a peripherally extending edge 20 and at least one inwardly facing surface 22 defining, in part, a recessed interior and into which may be inserted a plurality of wires (also not shown) for subsequent communication to a wall outlet plug, switch or the like. As will also be subsequently described in more detail, the outlet box 12 is illustrated in a first substantially rectangular configuration associated with a "single gang" outlet or switch, it however being understood that both the box 12 and associated combination protecting and locating insert 10 of the invention can be reconfigured in "double gang" rectangular configuration or circular configuration at the election of one skilled in the art.

The combination protective covering and insert 10 is constructed as a three dimensional housing with a forward facing and peripherally extending planar face 24, a rearwardly spaced and recessed base surface 26 and, in the embodiment of FIG. 1, first 28, second 30, third 32 and fourth 34 interconnected side walls connecting the peripherally extending planar face 24 and the rearwardly spaced base 26 and to define a substantially rectangular configuration with a centrally disposed and recessed interior. As previously described, the rectangular construction of the insert 10 can easily be modified to matingly associate with double gang (or even other plurality gang sized utility boxes) within the scope of the relevant art.

A spike 36 is secured to the recessed base surface 26 at a substantially midpoint location of the insert 10 and extends outwardly and forwardly to a point 38 a predetermined spaced distance beyond the peripherally extending planar face. Referring to the side cutaway of FIG. 4, the projected spacing of the spike 36 is again illustrated and so that its tip 38 will engage and pierce the wall covering material 14, typically drywall or a like consistency material which may be pierced upon application of a reasonable degree of pressure against the spike. In the first preferred embodiment, the spike 36 is constructed as an elongated fastener with an extending shaft, upon which are placed a specified plurality of exteriorly facing threads 40 located proximate a head 42 of the combination fastener/spike 36. Although not shown, the head 42 is configured to be engaged by a conventional Philips or American head screwdriver and so that a nut 44 may be threadably engaged upon the threads 40 and the spike 36 fixedly secured in place.

In application, the spike tip 38 pierces through a specified location of the wall covering material 14 during application of the material over the insert 10 and associated box 12 and functions to identify a midpoint of the utility box interior. Additional illustrations of tile application of tie wall covering 14 over the utility box 12 and matingly engaged insert 10 are again shown in the perspective and planar views of FIGS. 2 and 3, respectively.

Specifically referring to FIG. 3, an initial insertion of a router or similar combination sawing and drill bit is illustrated at 46 at a specified location proximate the spike 36 and well within the recessed confines defined between the planar and peripherally extending face 24 and the recessed base 26. An additional advantage of the insert 10 is provided by this recessing configuration and which provides the combined features of permitting the rotor bit 26 to be is initially engaged at a certain within tile area of the insert 10 and associated utility box 12 and at the same time insulated from contact with the wires extending within the further recessed confines of the box 12.

The router bit 46 is translated in a direction 48, until impacting against the side wall corresponding with the metal or hardened plasticized construction of the utility box 12. The bit 46 is then withdrawn and reinserted at position 46' to an exterior edge location of the box 12 and then translated along directional arrow 50 corresponding to an abutting edge pattern around the outer circumference of the box 12 and such as to a further intermediate position 46". It is known in the art that a specified degree of inward pressure applied against the peripheral outer edges of the insert 10 and box 12, combined with translation (along arrow 50), results in a clean and closely aligned sectioning of the wall board material 14 and further that the router bit, in certain applications, is preferably applied in a counter clockwise as opposed to clockwise cutting direction around the box exterior. It is also envisioned that the insert 10 may be left in place, once the wall covering 14 is applied, and removed through the resulting opening created by the sectioned portion of drywall, this providing for the highest degree of efficiency by the professional installer. It is also envisioned that the insert 10 can be removed entirely from the box, upon initial piercing by the spike and subsequent and temporary removal of the wall covering.

The application of the router bit 46 in this fashion represented only one of a number of conceivable machining operations, the purpose of which is to section only the wallboard material overlaying the insert 10 and utility box 12. As also previously stated, the location of the spike 36 relative to tile insert and associated utility box ensures that the damage to the wall covering material (resulting from the intended piercing) is localized in the area of the material overlying the box, and which is intended to be removed, and does not extend to adjacent and outlaying areas of wall covering bordering outside the box 12.

Figure 5:
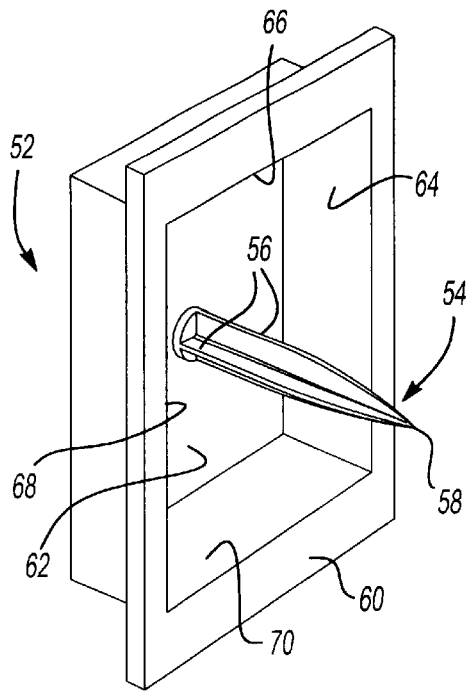
FIG. 5 is a perspective view of an integrally molded covering insert and locator according to a further preferred embodiment of the present invention.
Figure 6:
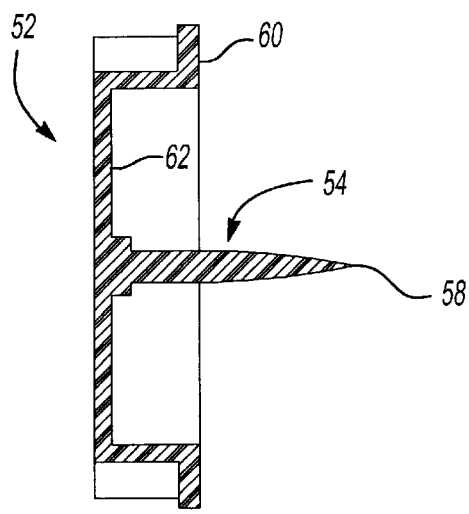
FIG. 6 is a cutaway view, similar to that illustrated in FIG. 4, and illustrating in side profile tile integrally molded construction of the covering insert and locator according to the second preferred embodiment.

Referring further to FIGS. 5 and 6, a further preferred embodiment 52 of the combination protective covering and insert is illustrated and which contemplates integrally forming the insert 52 and a spike 54 of a durable plasticized material and such as during an injection molding process. To facilitate penetration through the thickness of tie wall covering material, and to provide reinforcing rigidity to prevent bending, the spike 54 further includes a plurality of circumferentially offset and linear extending flutes 56 extending to forward directed point 58. The insert 52 otherwise includes similar features also disclosed in the insert 10 disclosed in FIGS. 1–4, these including forward facing and peripherally extending planar face 60, rearwardly spaced and recessed base surface 62 and first 64, second 66, third 68 and fourth 70 interconnected side walls connecting the peripherally extending planar face 60 and the rearwardly spaced base 62 and to define a substantially rectangular configuration with the centrally disposed and recessed interior. As also previously stated, an injection molded covering and locating insert can also be constructed in a rectangular "double-gang" or circular cross section within the skill of the relevant art.

Having described my invention, it discloses a novel and useful protective covering and locating insert for facilitating the efficient location of a utility box beneath an applied layer of wall covering material and to further assist in the sectioned removal of that portion of the wall covering overlaying the utility box and insert.

Additional advantages and preferred embodiments of the combination protecting and locating insert will become apparent to those skilled in the art to which it pertains and without departing from the scope of the appended claims. For example, the insert may be left in place after removal of the drywall section and to provide the additional benefit of preventing drywall mudding compound from seeping into the seams of the utility box. Maintaining the insert within the box also provides for continued insulating protection to the wires and up to the point at which it is desirable to install the outlet gang, switch or other conventional device.

We claim:

1. A combination protective covering and locating insert for use with an electrical utility box during an application of a wall covering material over a structural framing to which said insert is secured, the utility box including a peripherally extending edge and at least one inwardly facing surface defining, in part, a recessed interior, said insert comprising:

a three dimensional housing with a forward facing and peripherally extending planar face, a rearwardly spaced and recessed base surface, and at least one side wall connecting said peripherally extending planar face and said rearwardly spaced base to define a recessed interior;

a spike secured to said recessed base surface at a substantially midpoint location of said insert and extending forwardly to a point a predetermined spaced distance beyond said peripherally extending planar face; and said at least one side wall of said insert having an exterior facing surface which matingly engages with the at least one inwardly facing surface of the utility box and upon installing said insert within a selected volume of the recessed interior so that said recessed base surface of said housing is recessed within the utility box;

said spike piercing through a specified location of the wall covering material during application of the wall covering material over said insert and identifying a midpoint of the utility box interior, associated damage to the wall covering material resulting from the intended piercing being localized in an area of the material overlaying the box only.

2. The combination protective covering and locating insert of claim 1, said spike further comprising an elongated fastener having a specified plurality of exteriorly facing threads located proximate a head of said fastener, said spike inserting through an aperture defined in said recessed base surface and securing in place by a threadably engageable nut.

3. The combination protective covering and locating insert of claim 1, said spike further comprising a plasticized material which is integrally formed with said insert during an injection molding process.

4. The combination protective covering and locating insert of claim 3, said spike further comprising a plurality of circumferentially offset and linear extending flutes.

5. The combination protective covering and locating insert of claim 1, said insert being constructed of a durable and plasticized material, said at least one side wall further comprising first, second, third and fourth interconnecting side walls defining a substantially rectangular shape and for use with a likewise rectangular utility box.

6. A combination protective covering and locating insert for use with an electrical utility box, comprising:

a housing with a forward facing and peripherally extending planar face and a rearwardly spaced and recessed base surface, and at least one side wall connecting said planar face and said base surface to define a recessed interior, said insert matingly engaging within an interior defined by the utility box and so that said recessed base surface of said housing is recessed within the utility box; and a spike secured to said recessed base surface at a substantially midpoint location of said insert and extending forwardly to a point a predetermined spaced distance beyond said peripherally extending planar face, said spike further comprising a plasticized material which is integrally formed with said insert during an injection molding process, said spike further comprising a plurality of circumferentially offset and linear extending flutes which pierce through a specified location of a wall covering material during application of the wall covering over said insert and associated utility box and identifying a midpoint of the utility box interior, associated damage to the wall covering material resulting from the intended piercing being localized in an area of the material overlaying the box only.

* * * * *